(12) United States Patent
Komatsu et al.

(10) Patent No.: US 6,195,225 B1
(45) Date of Patent: Feb. 27, 2001

(54) DISK DRIVE HAVING ANTI-WOBBLING MECHANISM

(75) Inventors: Hisateru Komatsu, Tendo; Makoto Takahashi, Obanazawa, both of (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/266,308

(22) Filed: Mar. 11, 1999

(30) Foreign Application Priority Data

Mar. 17, 1998 (JP) .................................................. 10-066788

(51) Int. Cl.⁷ .................................................. G11B 33/00
(52) U.S. Cl. ...................... 360/99.01; 360/99.04
(58) Field of Search ............................ 360/97.01, 99.01, 360/97.04, 99.04; 369/77.2, 75.1

(56) References Cited

U.S. PATENT DOCUMENTS

| 4,692,828 | * | 9/1987 | Noda et al. | 360/78.04 |
| 4,713,714 | * | 12/1987 | Gatti et al. | 360/137 |
| 4,812,932 | * | 3/1989 | Hishinuma et al. | 360/97.01 |
| 4,845,581 | * | 7/1989 | Bronshvatch | 360/98.01 |
| 5,062,016 | * | 10/1991 | Zupancic | 360/97.01 |
| 5,633,768 | * | 5/1997 | Watanabe | 360/99.01 |
| 5,805,378 | * | 9/1998 | Konno et al. | 360/97.01 |
| 5,875,068 | * | 2/1999 | Sawada | 360/99.01 |

FOREIGN PATENT DOCUMENTS

| 8-147848 | * | 6/1996 | (JP) . |
| 9-91814 |   | 4/1997 | (JP) . |
| 9-91866 |   | 4/1997 | (JP) . |
| 9-91943 |   | 4/1997 | (JP) . |
| 11-203767 |   | 7/1999 | (JP) . |

* cited by examiner

*Primary Examiner*—Brian E. Miller
(74) *Attorney, Agent, or Firm*—Frishauf, Holtz, Goodman, Langer & Chick, P.C.

(57) ABSTRACT

A casing 60 made of metal and having side walls 60-1 formed on both sides thereof is attached to a chassis 30 to over a back surface of the chassis 30. The casing 60 is coupled to the chassis with its side walls fitted to outer surfaces of side walls 30-1 of the chassis 30. The casing is fixed to the chassis by screws at two positions on both sides in an intermediate portion in a longitudinal direction. Moreover, a mechanism for suppressing wobbling motion of the casing is formed on the side walls of the casing and the chassis in the vicinity of longitudinal opposite ends.

5 Claims, 5 Drawing Sheets

DISK DRIVE HAVING ANTI-WOBBLING MECHANISM

BACKGROUND OF THE INVENTION

The present invention relates to a disk drive for use in recording and reproducing data on a disk-shaped recording medium such as a magnetic disk and, in particular, to a carriage mechanism of the disk drive.

Referring to FIGS. 1 through 3, a conventional magnetic disk drive designed for magnetic disks will be described. Such a magnetic disk drive is disclosed in, for example, Japanese Patent Laid-Open (JP-A) No. 9-91943. In the magnetic disk drive illustrated in FIG. 1, a reception mechanism and an ejection mechanism for receiving and ejecting a magnetic disk, respectively, are omitted for clarity of illustration. A chassis 10 comprises a pair of side walls 10-1 on both sides thereof. All components and parts are mounted on a principal surface of the chassis 10. A main printed wiring board 11 and a subsidiary printed wiring board 20 are fixed by screws to the principal surface of the chassis 10. For the main printed wiring board 11, two support members 10-2 (FIG. 2) are formed integrally with the chassis 10 by cutting and rising corresponding portions of a principal plate of the chassis 10. The main printed wiring board 10 is fixed onto the support members 10-2 by the use of screws 12.

A stepping motor 13 is attached to a rear wall 10-3 at a rear end of the chassis 10. An output shaft 13-1 of the stepping motor 13 penetrates through the rear wall 10-3. The output shaft 13-1 has a top end rotatably supported by a shaft receptacle 10-4 integrally formed with the chassis 10 by cutting and rising a corresponding portion of the principal plate of the chassis 10. The output shaft 13-1 has a threaded outer peripheral surface. A carriage mechanism 14 is provided with an arm 14-1 with a pin 14-2 embedded therein. The pin 14-2 is engaged with the threaded outer surface of the output shaft 13-1. With this structure, rotation of the output shaft 13-1 brings about the movement of the carriage mechanism 14 in the same direction as the output shaft 13-1. On the carriage mechanism 14, magnetic heads are mounted for access to the magnetic disk. The carriage mechanism 14 serves to move the magnetic heads in the radial direction of the magnetic disk.

The carriage mechanism 14 is provided with a U-shaped bearing arm 14-3 formed on the side opposite to the arm 14-1. A guide bar 15 penetrates through the bearing arm 14-3. The guide bar 15 is held by a guide bar clamp 16. With this structure, the carriage mechanism 14 is guided by the guide bar 15 during the movement following the rotation of the output shaft 13-1. The guide bar clamp 16 is fixed by a screw to a support plate 10-5 (FIG. 2). The support plate 10-5 is formed integrally with the chassis 10 by cutting and rising a corresponding portion of the principal plate of the chassis 10, and projects upward through a hole formed in the main printed wiring board 11.

In FIG. 3, a motor 21 for rotating the magnetic disk and other circuit components (not shown) are mounted on a subsidiary printed wiring board 20 only on the upper surface thereof. Accordingly, the subsidiary printed wiring board 20 is fixed to the principal plate of the chassis 10 by the screws 12 (FIG. 1) to be substantially in contact therewith at the position closer to a slot for the magnetic disk, i.e., to a front bezel 17.

The structure of the motor 21 will briefly be described. The motor 21 comprises a rotation shaft 21-1, a center metal 21-2, a plurality of cores 21-3, a plurality of stator coils 21-4, a ring-shaped permanent magnet 21-5, and a circular casing 21-6 attached to the rotation shaft 21-1. The center metal 21-2 has a cylindrical shape and serves as a bearing. Each of the cores 21-3 radially outwardly extends from the center. Each of the stator coils 21-4 is wound around an end portion of each corresponding core 21-3. The permanent magnet 21-5 surrounds these cores 21-3. The casing 21-6 holds the permanent magnet 21-5. When the rotation shaft 21-1 is rotated, the permanent magnet 21-5 and the casing 21-6 rotate together with the rotation shaft 21-1. A reference numeral 21-7 depicts an index magnet. A combination of the cores 21-3 and the stator coils 21-4 serves as a stator of the motor 21. A combination of the permanent magnet 21-5 and the casing 21-6 serves as a rotor of the motor 21. The stator and the rotor of the type are disclosed in, for example, Japanese Patent Laid-Open (JP-A) No. 9-91866 and, therefore, will not be described in detail.

The casing 21-6 has a protruding portion formed at its center and a flat portion 21-6a formed on an upper surface of the protruding portion. To the flat portion 21-6a, a disk table 21-8 formed by a plastic magnet is integrally fixed. The flat portion 21-6a is provided with an arm 22 attached to a bottom surface thereof. A drive roller 23 is rotatably mounted on the arm 22. Each of the flat portion 21-6a and the disk table 21-8 has a generally rectangular hole formed therein. Through these holes, the drive roller 23 projects upward from the disk table 21-8. The magnetic disk received in the magnetic disk drive is placed on the disk table 21-8. The drive roller 23 is inserted in and engaged with a hole formed in a hub of the magnetic disk. Thus, the magnetic disk is rotated following the rotation of the rotor. The disk table 21-8 is disclosed in, for example, Japanese Patent Laid-Open (JP-A) No. 9-91814 and is not described in detail herein.

Above the motor 21, an eject plate 24 and a disk holder unit 25 are incorporated as the ejection mechanism the reception mechanism for the magnetic disk, respectively. The eject plate 24 and the disk holder unit 25 are also disclosed in the above-mentioned Japanese Patent Laid-Open (JP-A) No. 9-91814 or 9-91943. The chassis 10 is coupled with a cover plate 18 to protect an internal space inside the chassis 10.

In the above-mentioned disk drive, the motor 21 is mounted on the principal surface of the chassis 10, in other words, built inside the chassis 10. With this structure, magnetic flux generated from the stator coil 21-4 or the permanent magnet 21-5 acts on the magnetic head to adversely affect data reading or writing operation. Moreover, since the motor 21 is built inside the chassis 10, a greater part of a limited space on the principal surface of the chassis 10 is occupied by the motor 21. This inevitably restricts a mounting space for other mechanisms. In order to solve the above-mentioned problems, the present inventors have proposed, as a previous technique, a disk drive illustrated in FIG. 4 (Japanese Patent Application No. 10-1988 published as a JP-A 11-203767 on Jul. 30, 1999). FIG. 4 shows a characteristic part of the magnetic disk drive, including a chassis 30 and a drive motor 40 (hereinafter simply referred to as a motor) attached to the chassis 30 for rotating a magnetic disk.

The chassis 30 bears a reception mechanism for receiving a magnetic disk, an ejection mechanism for ejecting the magnetic disk that has been received, a carriage mechanism which has a head unit for accessing the magnetic disk and which carries the head unit so that the head unit is movable in a radial direction of the magnetic disk, and a moving mechanism for moving the carriage mechanism. All of these components are mounted on a principal surface of the chassis 30, i.e., an upper surface in FIG. 4. These components are well known in the art and will not be described herein. In other words, a feature of this embodiment lies in installation of the motor 40 in the chassis 30. Other configurations are basically similar to those of the conventional disk drive.

The motor 40 is similar in structure to the motor 21 described in conjunction with FIG. 3 and comprises a rotor 41 and a stator 42 combined with the rotor 41. The rotor 41 has a disk-shaped metallic casing 41-1. The casing 41-1 has a protruding portion 41-11 formed at its center to protrude upward. The protruding portion 41-11 has an upper surface to which a disk table 43 is mounted. The chassis 30 has an opening 30a which allows only an upper part of the protruding portion 41-11 to pass therethrough and project on the principal surface. Thus, the disk table 43 is projected on the principal surface of the chassis 30.

A rotation shaft 44 of metal is integrally fixed to the rotor 41 at the center thereof to pass through the casing 41-1 and the disk table 43. When the disk table 43 is injection-molded by the use of a plastic magnet, the casing 41-1 and the rotation shaft 44 are integrally assembled. The casing 41-1 has a cylindrical member 41-12 formed on its outer periphery to extend downward. A ring-shaped permanent magnet 45 is attached to an inner surface of the cylindrical member 41-12.

As described in conjunction with FIG. 3, the protruding portion 41-11 is provided with an arm 46 attached to a bottom surface thereof. A drive roller 47 is rotatably mounted on the arm 46. Each of the protruding portion 41-11 and the disk table 43 has a generally rectangular hole formed therein. Through these holes, the drive roller 47 projects upward from the disk table 43. The magnetic disk received in the magnetic disk drive is placed on the disk table 43. The drive roller 47 is inserted in and engaged with a hole formed in a hub of the magnetic disk. Thus, the magnetic disk is rotated following the rotation of the rotor 41.

On the other hand, the stator 42 is attached to a back surface of the chassis 30 by means of a metallic motor chassis 50 of metal. More specifically, the stator 42 is formed on a printed wiring board 51 mounted on the principal surface of the motor chassis 50. As described in conjunction with FIGS. 3 and 4, the stator 42 comprises a plurality of stator cores 42-1, a plurality of stator coils 42-2, and a bearing unit (center metal) 42-3. Each of the stator cores 42-1 extends radially outwardly from an outer periphery of a ring-shaped member of metal. Each of the stator coils 42-2 is wound around an end portion of each corresponding core 42-1. The bearing unit 42-3 is formed at the center of the printed wiring board 51 and supports the rotation shaft 44. The motor chassis 50 has a plurality of attaching elements 50-1 of an inverted-L shape which extend upward from a peripheral edge of the motor chassis 50 to abut against the back surface of the chassis 30.

A main printed wiring board corresponding to the main printed wiring board 11 described in conjunction with FIG. 3 is also mounted on the back surface of the chassis 30. With this structure, the receiving and the ejecting mechanisms for the magnetic disk, the carriage mechanism movably holding the magnetic disk, and the moving mechanism for moving the carriage mechanism can easily be mounted in the space on the principal surface of the chassis 30.

In the disk drive illustrated in FIG. 4, it is essential to provide a component for suppressing vibration or shock given to the chassis 30. Such a component can easily be implemented by a lower cover attached to the back surface of the chassis 30. However, the lower cover must be attached to the chassis 30 with flexibility in addition to sufficient mechanical strength against the vibration or the shock. The reason is given below. The disk drive of the type is generally combined with an electronic apparatus such as a personal computer and used as a memory device. The combination is achieved by fixing the lower cover with screws to an attaching element of the electronic apparatus. Typically, such fixation by the screws is carried out at a plurality of positions so that the lower cover is susceptible to mechanical strain. If the mechanical strain is transmitted from the lower cover to the chassis 30, the chassis 30 may be deformed to result in malfunction or operation error of a movable member formed on the principal surface of the chassis 30. In view of the above, it is necessary to attach the lower cover to the chassis 30 with flexibility.

SUMMARY OF THE INVENTION

It is therefore an object of the present invention to provide a disk drive in which a lower cover for suppressing vibration or shock applied to a chassis is attached to the chassis with flexibility.

A disk drive according to the present invention comprises a receiving mechanism for receiving a disk as a received disk on which data are recorded, an ejecting mechanism for ejecting the received disk that has been received, a carriage mechanism having a head unit for access to the received disk and holding the head unit so that the head unit is movable in a radial direction of the disk, a moving mechanism for moving the carriage mechanism, a disk table for holding and rotating the received disk, and a drive motor for rotating the disk table. The receiving mechanism, the ejecting mechanism, the carriage mechanism, and the moving mechanism are mounted on a principal surface of a chassis which is made of metal.

According to an aspect of the present invention, the chassis has a U-shaped section with side walls formed on each side thereof. The disk drive further comprises a motor chassis made of metal and a printed wiring board mounted on the motor chassis to form a stator of the drive motor on the back surface of the chassis. The stator includes a plurality of stator cores extending in a radial fashion and a plurality of stator coils each of which is wound around each of the stator cores. The motor chassis has an attaching element of an inverted L shape extending upward from its one end to be brought into contact with the back surface of the chassis. The back surface of the chassis is covered with a lower cover made of metal and having a U-shaped portion with side walls formed on each side thereof. The lower cover is coupled to the chassis with its side walls fitted to outer surfaces of the side walls of the chassis. The lower cover is screwed to the chassis at two positions on both sides in an intermediate portion in a longitudinal direction. The disk drive further comprises a mechanism for suppressing wobbling motion of the lower cover. The mechanism is formed on both side walls of the lower cover and the chassis at positions in the vicinity of longitudinal opposite ends of the lower cover and the chassis.

DESCRIPTION OF THE PREFERRED EMBODIMENT

Referring to FIGS. 5 through 8, description will be made about a preferred embodiment of the present invention in conjunction with the case where it is applied to a magnetic disk drive similar to that illustrated in FIG. 4.

Figure 1:
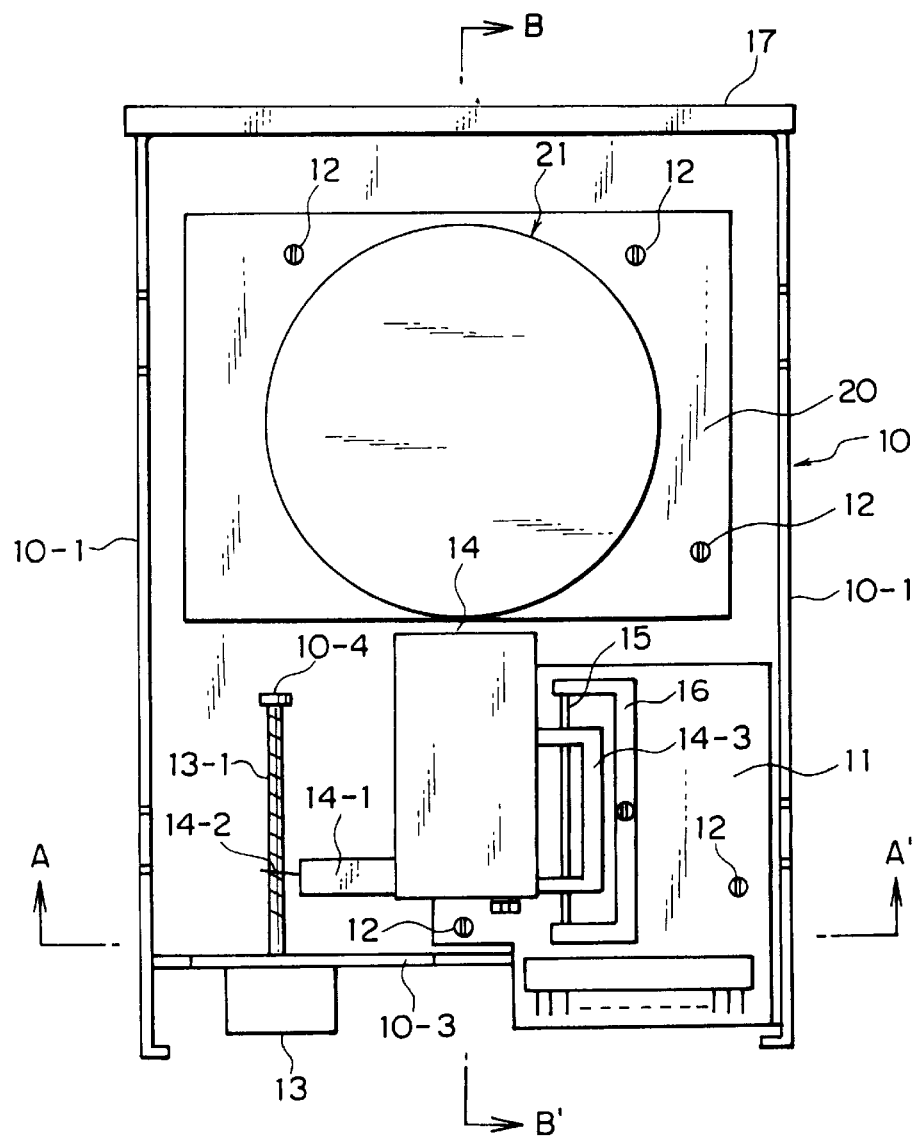
FIG. 1 is a plan view showing an internal structure of a conventional disk drive including a main printed wiring board, a subsidiary printed wiring board, a carriage mechanism, and other peripheral mechanisms.
Figure 2:
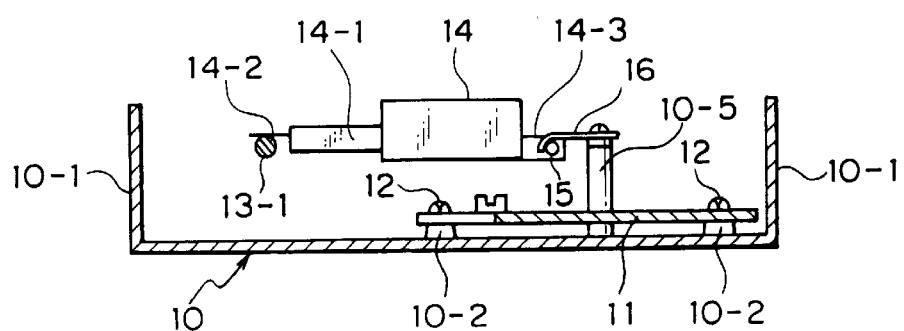
FIG. 2 is a sectional view taken along a line 2—2 in FIG. 1.
Figure 3:
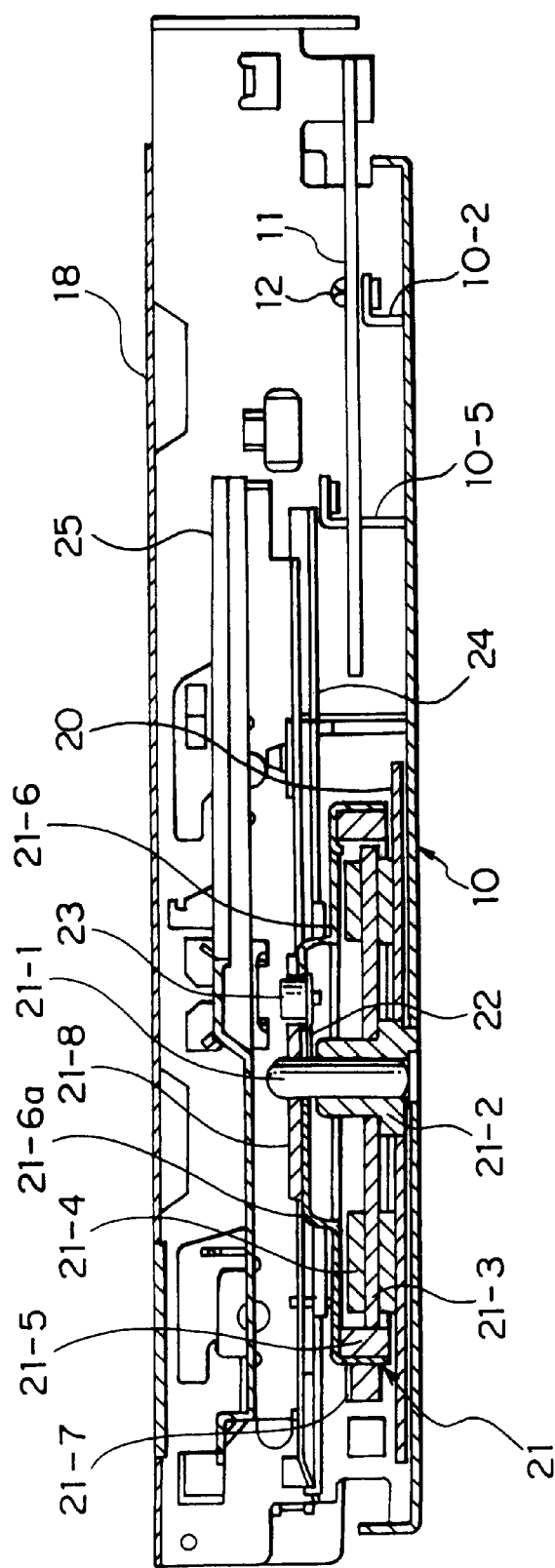
FIG. 3 is a sectional view taken along a line 3—3 in FIG. 1.
Figure 4:
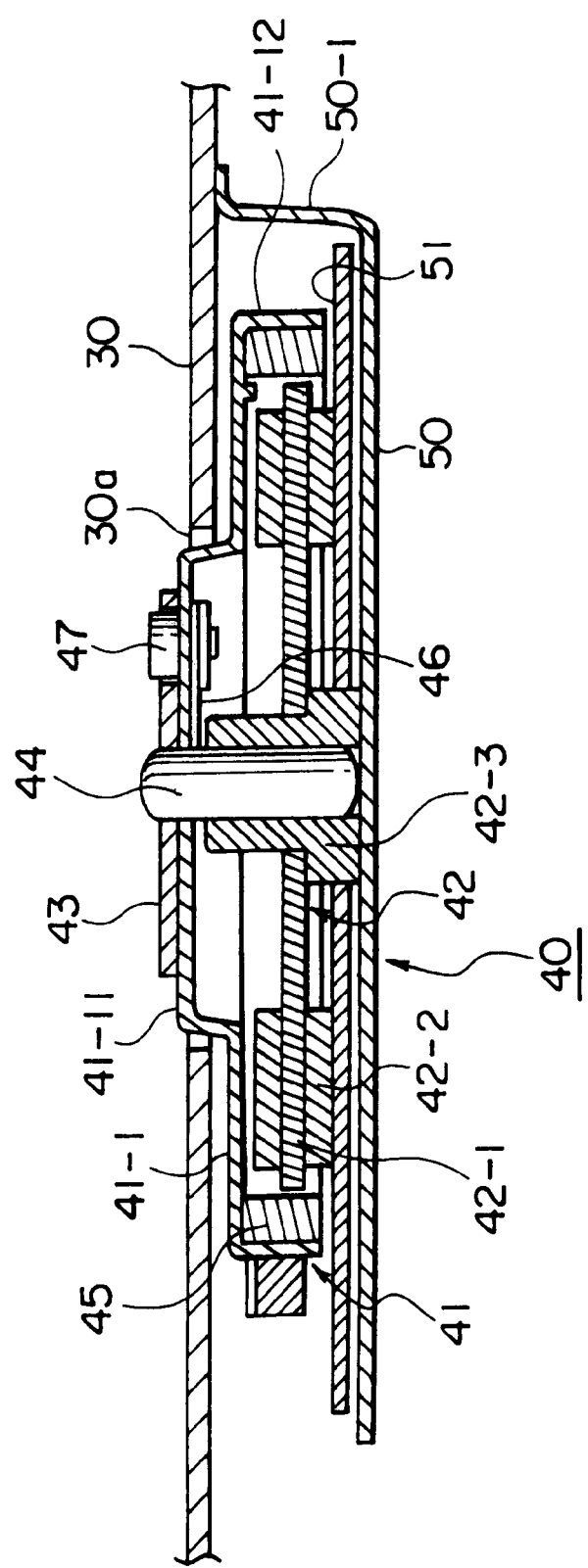
FIG. 4 is a sectional view of a disk drive to which this invention is applicable, showing the relationship between a chassis and a motor attached to the chassis for driving the rotation of a magnetic disk.
Figure 5:
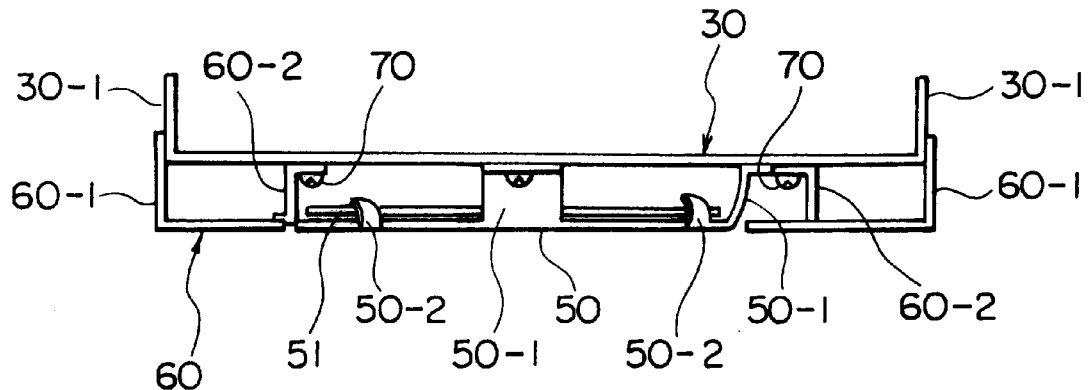
FIG. 5 is a front view of the disk drive in FIG. 4, showing the relationship between the chassis, a motor chassis, and a casing.
Figure 6:
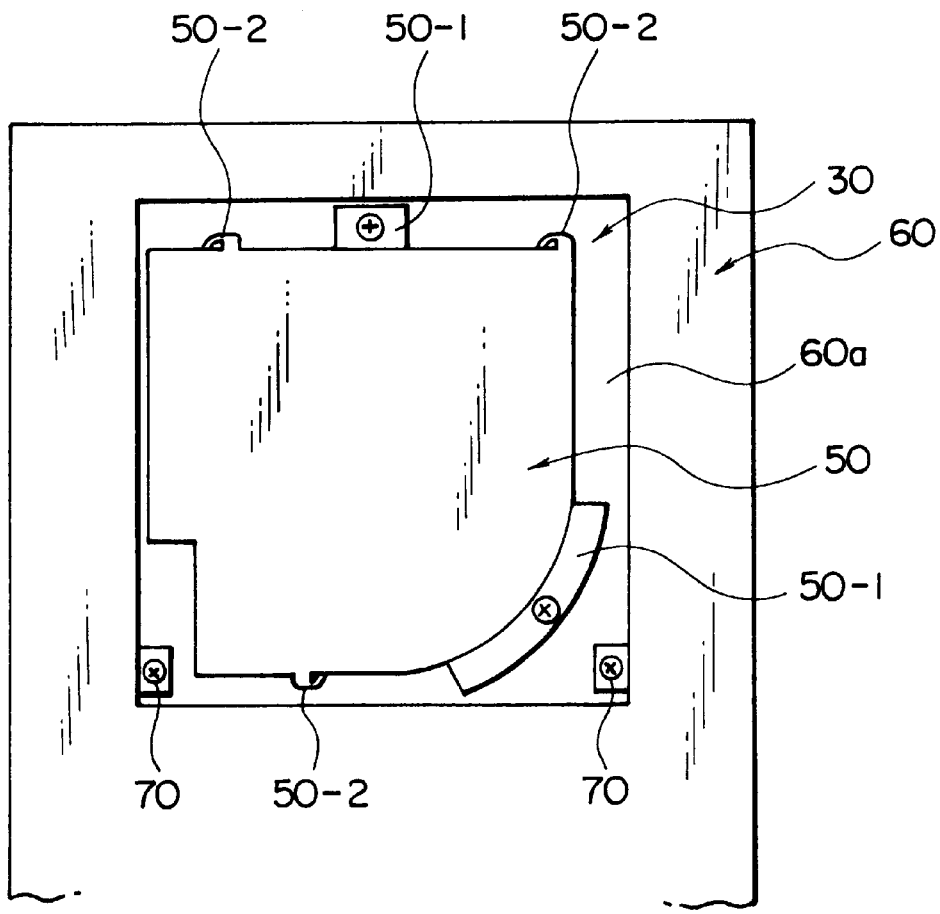
FIG. 6 is a bottom view of the chassis, the motor chassis, and the casing illustrated in FIG. 5.

FIG. 5 shows in detail the chassis 30, the motor chassis 50, and the printed wiring board 51 among various components of the disk drive (FIG. 4). In FIGS. 5 and 6, the chassis 30 has side walls 30-1 formed on both sides thereof. The stator 42 of the motor 40 projects on the back surface of the chassis 30. Therefore, in this embodiment, the chassis 30 is provided with a casing 60 called a lower cover that is assembled with the chassis 30 on the back surface thereof. Like the chassis 30, the casing 60 has side walls 60-1 formed on both sides thereof and has a U-shaped section. The casing 60 is removably fitted to the chassis 30 on the outer surface of the side walls 30-1 thereof. The casing 60 is formed so that its principal surface is coplanar with the motor chassis 50 when assembled with the chassis 30. The casing 60 has an opening 60a formed at a region corresponding to the motor chassis 50.

In the illustrated example, attaching elements 50-1 are provided at two positions. The attaching elements 50-1 are attached by the screws to the back surface of the chassis 30. The motor chassis 50 is provided with a plurality of (herein, three) latches 50-2 formed at separate positions on its peripheral edge. The latches 50-2 are for fixing the printed wiring board 51 onto the motor chassis 50.

The casing 60 is fixed to the chassis 30 by screws 70 at two positions on both sides of an intermediate portion of the chassis 30 in the longitudinal direction thereof. For this purpose, the casing 60 is provided with attaching elements 60-2 as L-shaped bent portions formed on the edge of the opening 60a thereof. Moreover, on the side walls 60-1 of the casing 60 and the side walls 30-1 of the chassis 30, anti-wobbling mechanisms for suppressing wobbling motion of the casing 60 are formed at positions in the vicinity of longitudinal opposite ends.

Figure 7:
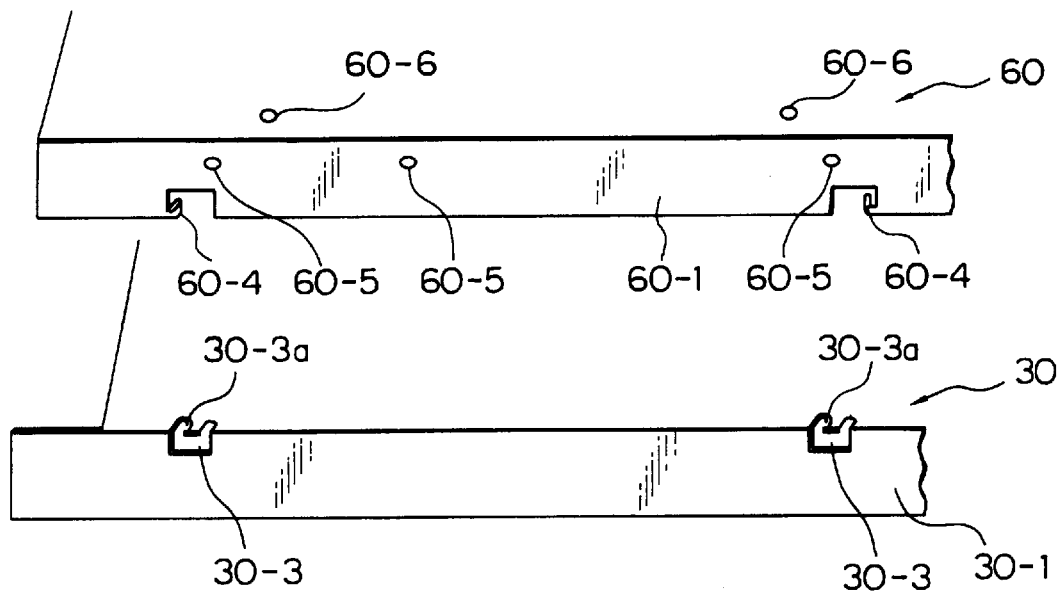
FIG. 7 is a perspective view for describing the attachment of a lower cover to the chassis.
Figure 8:
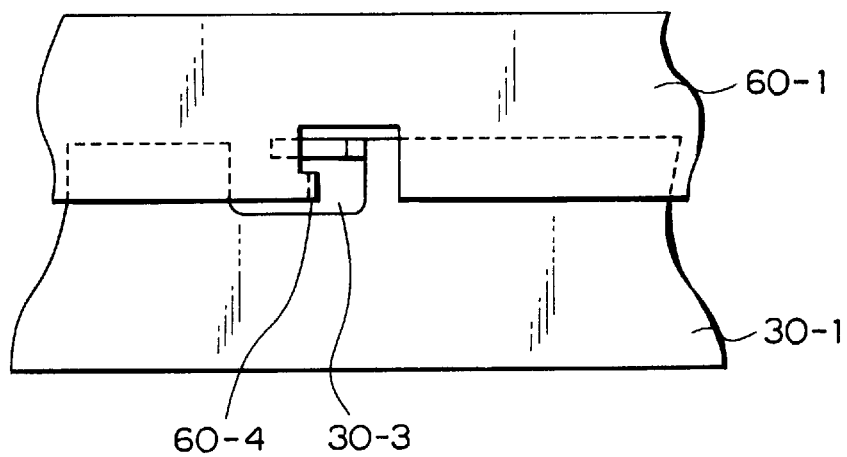
FIG. 8 is an enlarged view showing an anti-wobbling mechanism illustrated in FIG. 7.

Referring to FIGS. 7 and 8, description will be made about the anti-wobbling mechanisms. Each of the side walls 60-1 of the casing 60 is provided with two latches 60-4. On the other hand, each of the side walls 30-1 of the chassis 30 is provided with notches 30-3 each of which is engageable with each corresponding latch 60-4 and serves to prevent the latch 60-4 from being dislocated both in a backward/forward, namely, longitudinal direction and in a vertical direction. Each notch 30-3 has a cut portion 30-3a extending on the principal surface of the chassis 30. The cut portion 30-3a serves to prevent the collision of the latch 60-4 when the side wall 60-1 of the casing 60 is fitted to the side wall 30-1 of the chassis 30. Specifically, the latch 60-4 of the casing 60 is put into the notch 30-3 through the cut portion 30-3a. Thereafter, the casing 60 is slid rightward in FIG. 7 to be put into the state shown in FIG. 8. As seen from FIG. 8, a small gap is formed between the latch 60-4 and the edge of the notch 30-3 in each of the backward/forward and the vertical directions.

As described above, each of the side walls 60-1 of the casing 60 is provided with threaded holes 60-5 formed at three positions to fix by screws the disk drive to an electronic apparatus such as a personal computer. Similar threaded holes 60-6 are formed on the principal surface of the casing 60 at two positions in the vicinity of each side wall 60-1. Thus, the threaded holes are formed on both the side walls and the principal surface of the casing 60. This is because, depending on the structure of the electronic apparatus, the disk drive is fixed to the electronic apparatus either at the side wall 60-1 or at the principal surface thereof. In case where the disk drive is fixed at the side wall 60-1, it is possible to select, as screwing positions, two threaded holes among the three threaded holes. Specifically, in FIG. 7, it is possible to select one of a combination of the rightmost and the leftmost threaded holes and another combination of the intermediate and the rightmost threaded holes.

In any event, the casing 60 is fixed to the electronic apparatus by the screws at four positions on its both sides. It is therefore difficult to prevent the casing 60 from being subjected to mechanical strain due to the screwing. On the other hand, the casing 60 is screwed to the chassis 30 only at the two positions on both sides in the intermediate portion in the longitudinal direction and the side walls of the casing 60 and the chassis 30 are fitted to each other through the anti-wobbling mechanism, as described above. As a result, the casing 60 is fixed to the chassis 30 by the screws 70 at its intermediate portion with sufficient mechanical coupling strength resistant against vibration or shock. Moreover, in remaining portions except the fixing or screwing portion, particularly at the longitudinal opposite ends, the casing 60 has flexibility with respect to the chassis 30 with wobbling motion suppressed to some extent by the above-mentioned anti-wobbling mechanism. Therefore, even if the casing 60 is subjected to mechanical strain due to the screwing, such mechanical strain is never transmitted to the chassis 30.

It is noted here that the notches 30-3 and the latches 60-4 can be reversed in position. In other words, the notches may be formed on the side wall 60-1 of the casing 60 while the latches may be formed on the side wall 30-1 of the chassis 30.

As described in the foregoing, according to the present invention, the casing (the lower cover) for suppressing the vibration or the shock applied to the chassis can be fixed to the chassis not only with the sufficient mechanical strength against the vibration or the shock but also with the flexibility to avoid propagation of the mechanical strain.

What is claimed is:

1. A disk drive comprising a receiving mechanism for receiving a disk as a received disk, on which data is recorded, an ejecting mechanism for ejecting said received disk, a carriage mechanism having a head unit for access to said received disk and holding a head unit so that said head unit is movable in a radial direction of said received disk, a moving mechanism for moving said carriage mechanism, a disk table for holding and rotating said received disk, and a drive motor for rotating said disk table, said receiving mechanism, said ejecting mechanism, said carriage mechanism, and said moving mechanism being mounted on a principal surface of a chassis which is made of metal, wherein:

said chassis has a U-shaped section with side walls formed on each side thereof;

said disk drive further comprises a motor chassis of metal and a printed wiring board mounted on said motor chassis to form a stator of said drive motor on said back surface of said chassis;

said stator including a plurality of stator cores extending in a radial fashion and a plurality of stator coils each of which is wound around each of said stator cores;

said motor chassis comprises an attaching element having an inverted L shape extending upward from its one end to be brought into contact with said back surface of said chassis; and said back surface of said chassis being covered with a lower cover made of metal and having a U-shaped portion with side walls formed on each side thereof, said lower cover being coupled to said chassis with its side walls fitted to outer surfaces of said side walls of said chassis, said lower cover being screwed to said chassis at two positions on both sides in an intermediate portion in a longitudinal direction, said disk drive further comprising an anti-wobbling mechanism for suppressing wobbling motion of said lower cover, and said anti-wobbling mechanism being formed on said both side walls of said lower cover and said chassis in the vicinity of longitudinal opposite ends of said lower cover and said chassis.

2. A disk drive as claimed in claim 1, wherein at least one of each side wall of said lower cover and a principal surface of said lower cover is provided with threaded holes formed at a plurality of positions to fix by screws said disk drive to another apparatus.

3. A disk drive as claimed in claim 1, wherein said anti-wobbling mechanism comprises a latch formed on one of each side wall of said lower cover and each side wall of said chassis, and a notch which is formed on the other side wall of each of said cover and chasis and which is engageable with said latch to prevent said latch from being dislocated both in a backward/forward direction and in a vertical direction.

4. A disk drive as claimed in claim 3, wherein a small gap is formed between said latch and an edge of said notch in each of the backward/forward and the vertical directions of said disk drive.

5. A disk drive as claimed in claim 4, wherein said lower cover has an opening formed on a principal surface thereof at a region corresponding to said motor chassis, said lower cover being attached to said chassis so that said principal surface is flush with said motor chassis.

* * * * *